United States Patent [19]
Yurugi et al.

[11] 3,764,598
[45] Oct. 9, 1973

[54] PYRIMIDOPYRIDAZINE DERIVATIVES
[75] Inventors: Shojiro Yurugi, Kyoto; Shintaro Kikuchi, Hyogo, both of Japan
[73] Assignee: Takeda Chemical Industries, Ltd., Osaka, Japan
[22] Filed: Sept. 24, 1970
[21] Appl. No.: 75,294

[30] Foreign Application Priority Data
Sept. 24, 1969 Japan.............................. 44/76125
June 24, 1970 Japan.............................. 45/54984

[52] U.S. Cl..... 260/246 B, 260/256.4 F, 260/256.5, 424/248
[51] Int. Cl............................................ C07d 87/40
[58] Field of Search................... 260/256.4 F, 246 B

*Primary Examiner*—Alex Mazel
*Assistant Examiner*—Jose Tovar
*Attorney*—Wenderoth, Lind and Ponack

[57]   ABSTRACT
Compounds of the formula

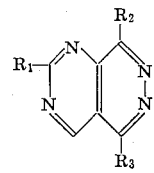

wherein $R_1$ stands for an aromatic hydrocarbon or a heterocyclic group, which is unsubstituted or substituted, $R_2$ and $R_3$ are the same or different and represent $-NH_2$, a secondary amino group or a tertiary amino group and their pharmaceutically acceptable salts are useful as diuretics. The compounds are produced by reacting a compound of the formula

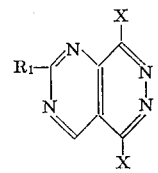

wherein $R_1$ has the same meaning as above and X is halogen including chlorine, bromine, etc. with an amine corresponding to $R_2$ and $R_3$ in the general formula [I]. Compounds of formula [II] are prepared by halogenation of a compound of the general formula [III]

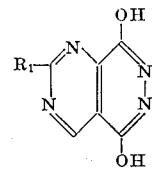

wherein $R_1$ has the same meaning as above.

19 Claims, No Drawings

PYRIMIDOPYRIDAZINE DERIVATIVES

The present invention relates to novel pyrimidopyridazine derivatives and their pharmaceutically acceptable salts, which have effective diuretic action.

The present invention also relates to intermediates for these derivatives and further relates to a process for the production of these pyrimidopyridazine derivatives and their intermediates.

There have been synthesized many kinds of diuretics, and some of them have been applied to practical use. Typical examples of these are chlorothiazine derivatives, acetazolamide, triamterene, trifrocine, furoceamide, etc.

However, the known diuretics are not entirely satisfactory in view of one or more drawbacks such as promoting the excretion of potassium as well as sodium, causing side effects (e.g., increase of blood glucose level and blood uric acid level) upon long-term administration, and showing rather low diuretic activity and rather high toxicity.

Under these circumstances, the present inventors have made extensive studies for providing effective diuretics accompanied with no such drawbacks as above.

As the result of their studies, the present inventors have succeeded in synthesizing novel pyrimido[4,5-d]-pyridazine derivatives, and have found that these compounds can answer the purpose.

The present invention has been accomplished on the basis of this finding.

Thus, the principal object of the present invention is to provide novel pyrimido[4,5-d]pyridazine derivatives useful as effective and improved diuretics. Another object is to provide intermediates for these novel compounds.

Further object is to provide a method for the production of these novel compounds and their intermediates.

The pyrimido[4,5-d]pyridazine derivatives of the present invention are those represented by the following general formula

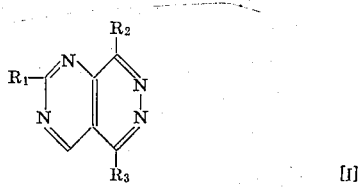

[I]

wherein $R_1$ stands for an aromatic hydrocarbon or a heterocyclic group, which is unsubstituted or substituted, $R_2$ and $R_3$ are the same or different and represent -NH$_2$, a secondary amino group or a tertiary amino group and their pharmaceutically acceptable salts.

In the general formula [I], the aromatic hydrocarbon represented by symbol $R_1$ is mono- or di- cyclic carbocyclic and includes, for example, phenyl, naphthyl, etc..

The heterocyclic group represented by symbol $R_1$ includes five to six-membered monocyclic ones containing one hetero atom of the group N, S and O, five to six-membered monocyclic ones containing two or more hetero atoms of the group N, S and O, and nine to 10-membered dicyclic ones containing one or more hetero atoms of the group N, S and O. Typical examples of the groups are, for example, furyl, thienyl, pyridyl, thianaphthenyl, benzofuranyl, quinolyl, oxazolyl, thiazolyl, etc..

Among the heterocyclic groups, the five and six-membered monocyclic ones containing one hetero atom of the group N, S and O are most preferable.

The aromatic hydrocarbon and heterocyclic groups are unsubstituted or substituted by one or more substituents. The substituents of the above-mentioned aromatic hydrocarbon or heterocyclic group may, for instance, be a lower alkyl (e.g., methyl, ethyl, propyl, isopropyl, etc.), halogen (e.g., chlorine, bromine, fluorine, iodine), nitro, a trihalogenomethyl (e.g., trifluoromethyl, trichloromethyl, etc.), an alkoxy such as lower alkoxy (e.g., methoxy, ethoxy, propoxy, etc.), an aryl (e.g., phenyl, tolyl, naphthyl, etc.), an aralkyl such as phenyl lower alkyl (e.g., benzyl, phenethyl, etc.), an acyl such as monocarboxylic acid acyl (e.g., acetyl, benzoyl, etc.), and acyloxy such as monocarboxylic acid acyloxy (e.g., acetyloxy, benzoyloxy, etc.), carboxyl, hydroxy, amino, mono- or dialkylamino, such as mono- or di- lower alkyl amino, and cyclic amino groups (e.g., pyrrolidino, piperidino, morpholino, piperazino and the like), etc..

The secondary or tertiary amino groups represented by symbols $R_2$ and $R_3$ may be same or different, and each of $R_2$ and $R_3$ includes, monoarylamino group, a cyclic amino group, a monoalkyl amino group and a dialkyl amino group, the alkyl group may be straight or branched chain or it may be cyclic and preferably has one to six carbon atoms.

The cyclic amino group may contain one or more substituents such as lower alkyls (e.g., methyl, ethyl, etc.) and aralkyls (e.g., benzyl, etc.). The mono- or dialkyl amino group also may contain one or more substituents such as hydroxy, aryl (e.g., phenyl, etc.), and lower alkoxy (e.g., methoxy, ethoxy, etc.).

The cyclic amino group is, for example, a five to six-membered heterocyclic group containing, in addition to the nitrogen atom, 0 or 1 member of the group of O, S or N, and includes, for instance, pyrrolidinyl, piperidyl, morpholino, piperazinyl, N-methyl-piperazinyl, N-benzyl piperazinyl, etc..

The mono- or dialkyl amino group includes for instance, methylamino, ethylamino, propylamino, isopropylamino, butylamino, cyclohexylamino, dimethylamino, diethylamino, methylethylamino, benzylamino, 2-ethoxyethylamino, 2-methoxy-ethylamino, N-methyl-2-hydroxyethylamino, N-benzyl-2-hydroxyethylamino, etc..

The monoarylamino contains an aryl group which is mono- or di- cyclic carboxylic and the group includes, for example, anilino, naphthylamino, etc..

The pharmaceutically acceptable salts of the present compounds include addition salts with an inorganic acid such as hydrochloric acid, sulfuric acid, nitric acid, phosphoric acid, etc. and with an organic acid such as oxalic acid, maleic acid, malic acid, tartaric acid, methanesulfonic acid, ethansulfonic acid, etc..

Typical compounds represented by the general formula [I] are exemplified below:
1. 2-Phenyl-5,8-dimorpholinopyrimido[4,5-d]pyridazine.
2. 2-Phenyl-5,8-dipyrolidinopyrimido[4,5-d]pyridazine.
3. 2-Phenyl-5,8-dipiperidinopyrimido[4,5-d]pyridazine.
4. 2-Phenyl-5,8-bis(N-benzylpiperazino)pyrimido-[4,5-d]pyridazino.

5. 2-Phenyl-5,8-bis(ethylamino)pyrimido[4,5-d]pyridazine
6. 2-Phenyl-5,8-bis(benzylamino)pyrimido[4,5-d]-pyridazine.
7. 2-Phenyl-5,8-bis(isopropylamino)pyrimido[4,5-d]-pyridazine.
8. 2-Phenyl-5,8-bis(n-propylamino)pyrimido[4,5-d]pyridazine.
9. 2-Phenyl-5,8-bis(N-methyl-2-hydroxyethylamino)-pyrimido[4,5-d]pyridazine
10. 2-Phenyl-5,8-bis(N-benzyl-2-hydroxyethylamino)-pyrimido[4,5-d]pyridazine
11. 2-(4-Chlorophenyl)5,8-dimorpholinopyrimido[4,5-d]-pyridazine.
12. 2-(4-Chlorophenyl)-5,8-dipiperidinopyrimido[4,5-d]-pyridazine.
13. 2-(4-Nitrophenyl)-5,8-dimorpholinopyrimido[4,5-d]-pyridazine
14. 2-(4-Nitrophenyl)-5,8-dipiperidinopyrimido[4,5-d]-pyridazine.
15. 2-(3-Tolyl)-5,8-dimorpholinopyrimido[4,5-d]pyridazine
16. 2-(3-Tolyl)-5,8-bis(isopropylamino)-pyrimido[4,5-d]-pyridazine
17. 2-(3-Tolyl)-5,8-dipiperazinopyrimido[4,5-d]-pyridazine
18. 2-(4-Chlorophenyl)-5-morpholino-8-isopropylaminopyrimido[4,5-d]pyridazine.
19. 2-(4-Nitrophenyl)-5-piperidino-8-morpholinopyrimido[4,5-d]pyridazine
20. 2-(4-Chlorophenyl)-5,8-bis(benzylamino)-pyrimido[4,5-d]-pyridazine.
21. 2-(4-Chlorophenyl)-5,8-dianilinopyrimido[4,5-d]-pyridazine.
22. 2-(β-Naphthyl)5,8-dimorpholinopyrimido[4,5-d]-pyridazine
23. 2-(β-Naphthyl)-5,8-dipiperidinopyrimido)-pyrimido[4,5-d]-pyridazine
24. 2-(β-Naphthyl)-5,8bis(isopropylamino)-pyrimido[4,5-d]-pyridazine
25. 2-(2-Furyl)-5,8-dimorpholinopyrimido[4,5-d]pyridazine
26. 2-(2-Thienyl)-5,8-dimorpholinopyrimido[4,5-d]pyridazine
27. 2-(2-Pyridyl)-5,8-dimorpholinopyrimido[4,5-d]pyridazine
28. 2-(2-Thianaphthenyl)-5,8-dimorpholinopyrimido[4,5-d]-pyridazine
29. 2-(2-Benzofuranyl)-5,8-dimorpholinopyrimido[4,5-d]-pyridazine
30. 2-(2-Quinolyl)-5,8-dimorpholinopyrimido[4,5-d]pyridazine
31. 2-(5Oxazolyl)-5,8-dimorpholinopyrimido[4,5-d]pyridazine
32. 2-(5Thiazolyl)-5,8-dimorpholinopyrimido[4,5-d]pyridazine
33. 2-Phenyl-5,8-bis(propoxyamino)pyrimido[4,5-d]-pyridazine
34. 2-Phenyl-5,8-bis(methoxyamino)pyrimido[4,5-d]pyridazine
35. 2-Phenyl-5,8-bis(ethoxyamino)pyrimido[4,5-d]pyridazine.
36. 2-(β-Naphthyl)-5,8-bis(methoxyamino)-pyrimido[4,5-d]-pyridazine.
37. 2-(2-Furyl)-5,8-bis(methoxyamino)-pyrimido[4,5-d]-pyridazine
38. 2-(2-Thienyl)-5,8-bis(methoxyamino)-pyrimido[4,5-d]-pyridazine
39. 2-(2-Pyridyl)-5,8-bis(methoxyamino)-pyrimido[4,5-d]-pyridazine
40. 2-Phenyl-5,8-bis(N-methyl-2-hydroxyethylamino)-pyrimido[4,5-d]pyridazine.

The present compounds of the general formula [I] are prepared by the reaction of a compound of the general formula [II]

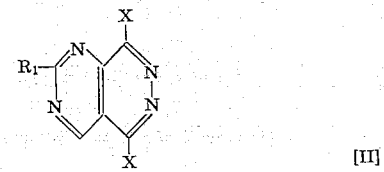

wherein $R_1$ has the same meaning as above and X is halogen including chlorine, bromine, etc. with an amine corresponding to $R_2$ and $R_3$ in the general formula [I].

The compounds of the above general formula [II] are novel ones and can be used as intermediates for various kinds of compounds among which are the compounds of formula [I].

The compounds of the general formula [II] can be prepared by halogenation of a compound of the general formula [III]

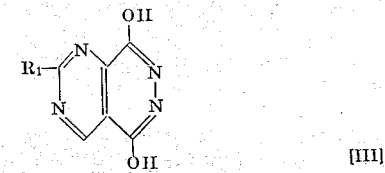

wherein $R_1$ has the same meaning as above.

The above-mentioned compounds of the general formula [III] are also novel and can be used as intermediates for various useful compounds including the compounds of the present invention.

The compounds [III] can be prepared by treating a compound of the general formula [IV]

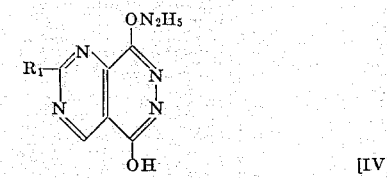

wherein $R_1$ has the same meaning as above with an inorganic acid.

The compounds of the general formula [IV] are prepared by reacting a compound of the general formula [V]

with a compound of the general formula [VI]

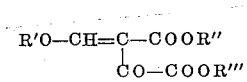

to produce a compound of the general formula [VII]

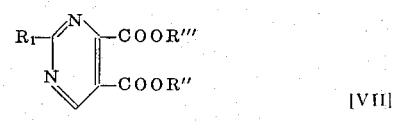

and then reacting the compound [VII] with hydrazine wherein $R_1$ has the same meaning as above and R', R" and R'" are lower alkyl such as methyl, ethyl, etc..

The reactions involved in the above-mentioned processes are described below;

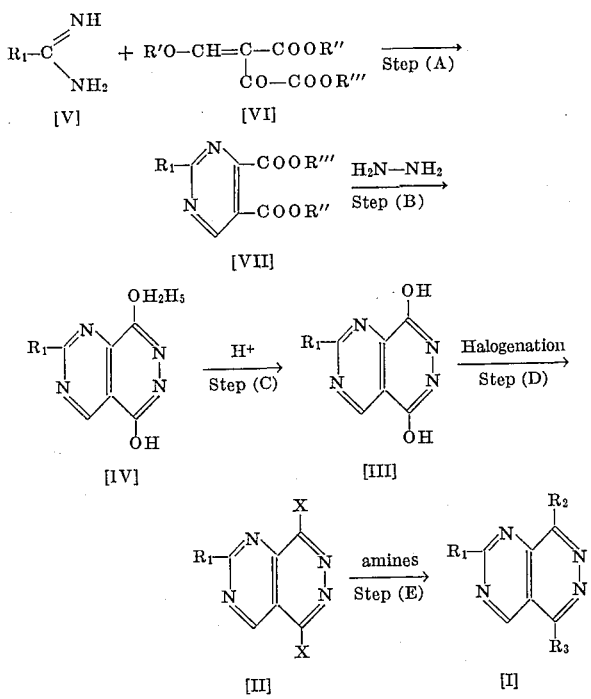

The following is a more detailed explanation of the respective steps.

The reaction of Step (A) is carried out preferably in a suitable solvent and in the presence of alkali metal alcoholate as a condensation agent.

The solvent may, for instance, be an alcohol (e.g., methyl alcohol, ethyl alcohol, etc.), chloroform, tetrahydrofuran, ethyl acetate, etc. The alkali metal alcoholate may be methylates, ethylates, etc. of sodium, potassium, lithium etc. The reaction of Step (A) is preferably carried out at room temperature or under cooling. The reaction of Step (B) is carried out preferably in a suitable solvent around the boiling point of the solvent used.

The solvent may, for instance, be water, alcohols (e.g. methyl alcohol, ethyl alcohol, etc.), tetrahydrofuran, dioxane or a mixture of two or more thereof.

The amount of hydrazine to be used in the reaction step (B) is preferably about 2 moles or more per mole of the compound [VII].

The reaction of Step (C) is conducted by treating a compound of the general formula [IV] with an acid.

As the above-mentioned acid, any of the acids which can convert the hydrazinium salt of the general formula [IV] to the corresponding hydroxyderivative of the general formula [III] may be used.

Typical examples of the acids usable are hydrochloric acid, sulfuric acid, acetic acid, etc.

The amount of the acid is usually a slight excess per mole of the compound [IV].

Generally, the reaction of step (C) proceeds easily by contacting a compound of the general formula [IV] with the diluted acid at room temperature or under cooling.

The reaction of the Step (D) is generally conducted by subjecting a compound of the general formula [III] to halogenation in a suitable solvent, and more particularly by heating under reflux a mixture of the compound of the general formula [III] and a halogenating agent.

As the halogenating agent, any of the conventional agents may be used. Typical examples of the halogenating agents are phosphorus oxychloride, phosphorus pentachloride, phosphorus tribromide, phosphorus trichloride, etc. or a mixture of two or more thereof, which can act also as a reaction solvent.

The above-mentioned solvent may, for instance, be pyridine, dimethysulfoxide, N,N-dimethylformamide, benzene, etc.

The reaction of Step (E) is carried out by reacting a compound of the general formula [II] with an amino compound corresponding to $R_2$ and $R_3$ of the general formula [I].

The reaction is preferably conducted in a suitable solvent or by using a large excess of the above-mentioned amine which can act also as a reaction solvent. The solvent may, for instance, be acetone, methyl alcohol, ethyl alcohol, tetrahydrofuran, chloroform, ethylacetate, benzene, etc.

The reaction temperature of the step (E) is generally around the boiling point of the solvent or an amine used in the reaction, but more higher reaction temperature may be used, if desired. When $R_2$ and $R_3$ are different in the reaction of Step (E), a compound of the general formula [II] is at first reacted with one of the amines corresponding to $R_2$ or $R_3$, and then the product is reacted with the other amino. The product may consist of two isomers in respect with the positions (5 or 8) of the respective groups of $R_2$ and $R_3$. The mixture as such can realize the object of the present invention without separation into respective isomers. But, if desired, the separation into respective isomer can be conducted after a conventional method, e.g., extraction with a suitable solvent, followed by a treatment with column-chromatography.

After completion of the reaction, the objective compound of the general formula [I] may be isolated and purified by a conventional method, e.g. extraction with a suitable solvent, followed by evaporation, recrystallization or a treatment with column-chromatography, etc.

When the objective compound is obtained as a free base, it may be converted to its salt with an acid such as organic acids (e.g., oxalic acid, malic acid, maleic acid, tartaric acid, etc.) and inorganic acids (e.g., hydrochloric acid, sulfuric acid, nitric acid, phosphoric acid, etc.).

The objective compounds of the general formula [I] have effective diuretic action.

Namely, the present compounds are characterized by the following properties.

1. The objective compounds of this invention have effective and strong diuretic action.
2. The present compounds show extremely low toxicity.
3. The present compounds induce urinary excretion of a large amount of sodium ion, but induce urinary excretion of relatively small amount of potassium ion which is an essential element to human body.

Thus, the excretion ratio of urinary $Na^+/K^+$ is comparatively high in the present compounds.

4. The present compounds can produce a marked additional diuretic response in the animal undergoing maximum diuresis with known diuretics. This fact suggests that the mechanism of diuretic action of the present compounds is different from those of known diuretics. Thus, combination of the present compounds with other known diuretics can produce much increased diuretic effect.

5. Even when the present compounds are administered successively for a long time, substantially no side effects (e.g., increase of blood glucose levels and blood uric acid levels) is observed.

Taking advantage of the above characteristic properties, the objection compounds of the present invention can be used as diuretics and are administered for the purpose per se or in the form of a pharmaceutically acceptable composition in admixture with a suitable and conventional carrier or adjuvant.

The pharmaceutical composition may take the form of tablets, granules, powders, capsules, injections and may be administered orally or parenterally.

Usual daily doses of the compounds lie in the range of about 10 to about 200 milligrams per human adult upon oral administration of about 1 to about 20 milligrams per human adult upon injectional administration (e.g., intravenously).

For showing pharmacological effect of the present compounds, the following test is provided.

PHARMACOLOGICAL TEST

1. Test compounds.

In the following test, test compounds are referred to as follows:

2. Material and Method.

Male CRCD/TA rats were deprived of food and water for 20 hours prior to the administration of the test compound.

The test compound was dissolved or suspended in physiological saline and administered to the rats in an amount of 30mg/kg. body weight in terms of the test compound by stomach tube in a saline load of 25ml./kg. body weight.

Six rats were used per one test compound. To the control group (six rats), saline of 25ml./kg. was administered by stomach tube.

The rats were placed individually in metabolium cages without food or water and a 5-hr pooled urine samples were collected and urine volumes were measured. And the samples were analyzed for urinary sodium and potassium.

3. Result.

TABLE. DIURETIC ACTIVITY IN SALINE-LOADED RATS

| Compound | Oral dose (mg/kg) | No. rats | (5 hr. collection) | | | |
|---|---|---|---|---|---|---|
| | | | UV | $U_{Na}V$ | $U_kV$ | $U_{Na}V/U_kV$ |
| A | 30 | 6 | ***1.93 | ***2.15 | **1.26 | ***1.71 |
| B | 30 | 6 | ***1.56 | ***1.85 | ***0.64 | ***2.99 |
| C | 30 | 6 | ***1.67 | ***1.99 | 1.15 | ***1.74 |
| D | 30 | 6 | ***2.01 | **1.68 | *1.81 | 0.97 |
| E | 30 | 6 | ***1.87 | **1.65 | *1.53 | 1.10 |
| F | 30 | 6 | **1.71 | *1.41 | 1.19 | 1.21 |
| G | 30 | 6 | *1.29 | 1.15 | 0.82 | 1.36 |
| H | 30 | 6 | 1.23 | *1.21 | 0.89 | *1.39 |
| I | 30 | 6 | ***2.38 | ***2.86 | **1.52 | **1.71 |
| J | 30 | 6 | 1.18 | *1.23 | 0.86 | *1.50 |
| K | 30 | 6 | **1.85 | **1.91 | *1.61 | 1.10 |
| Control | | 6 | 1.00 | 1.00 | 1.00 | 1.00 |

$$UV = \frac{\text{total volume of urine of the test group (per one rat, average value of 6 rats)}}{\text{total volume of urine of the control group (per one rat, average value of 6 rats)}}$$

$$U_{Na}V = \frac{\text{total Na}^+ \text{ milliequivalent in the excreted urine of the test group (per one rat, average value of 6 rats)}}{\text{total Na}^+ \text{ milliequivalent in the excreted urine of the control group (per one rat, average value of 6 rats)}}$$

$$U_kV = \frac{\text{total K}^+ \text{ milliequivalent in the excreted urine of the test group (per one rat, average value of 6 rats)}}{\text{total K}^+ \text{ milliequivalent in the excreted urine of the control group (per one rat, average value of 6 rats)}}$$

\* Significant difference ($0.01 < P < 0.05$).
\*\* Significant difference ($0.001 < P < 0.01$).
\*\*\* Significant difference ($P < 0.001$).

For further explanation of the present invention, following Examples are given wherein the word "part(s)" is based on weight unless otherwise noted, and relation between "part" and "Volume part" corresponds to that between gram and milliliter.

EXAMPLES

Part I [Step (A)]

To a mixture of 1.2 parts of benzamidine hydrochloride, 2.4 parts of ethyl ethoxymethyleneoxalacetate and 20 volume parts of methyl alcohol is dropwise added sodium methylate dissolved in methyl alcohol under cooling with ice until the pH value of the system becomes 8.0 to 8.5, followed by stirring for 4 hours.

After keeping at room temperature overnight, the reaction mixture is subjected to distillation under reduced pressure to remove the solvent.

To the residue is added water until an oily substance is no longer separated and the mixture is subjected to extraction with chloroform to collect the oily substance. After drying over anhydrous sodium sulfate and removing the solvent by distillation, the residue is subjected to distillation under reduced pressure. This procedure gives 2-phenyl-4,5-diethoxycarbonylpyrimidine boiling at 175° to 179° C/0.3mmHg.

Analysis:

Calculated for $C_{16}H_{16}N_2O_4$: C, 63.98; H, 5.37; N, 9.33

Found: C, 64.29; H, 5.50; N, 9.30

After a similar manner to the above, following compounds are produced.

| General formula | Substituent | | | Melting point (M.P.) or boiling point (B.P.) (° C.) |
|---|---|---|---|---|
| | $R_1$ | R'' | R''' | |
| $R_1$-pyrimidine-COOR''',COOR'' | –C₆H₄–CH₃ | $C_2H_5$– | $C_2H_5$– | B.P., 180–185/0.6 mm. Hg. |
| | –C₆H₄–Cl | $C_2H_5$– | $C_2H_5$– | M.P., 95–96. |
| | –C₆H₄–NO₂ | $C_2H_5$– | $C_2H_5$– | M.P., 124–125. |
| | thienyl (S) | $C_2H_5$– | $C_2H_5$– | M.P., 74. |
| | furyl (O) | $C_2H_5$– | $C_2H_5$– | M.P., 115. |
| | pyridyl (N) | $C_2H_5$– | $C_2H_5$– | M.P., 145 (decomp.). |
| | naphthyl | $C_2H_5$– | $C_2H_5$– | M.P., 94–95.5. |

Part II [Steps (B) and (C)]

1. A mixture of 12.8 parts of 2-phenyl-4,5-diethoxycarbonylpyrimidine, 26 parts of hydrazine monohydrate and 260 volume parts of methanol is heated under reflux for 3 hours. After cooling, the separated crystals are collected by filtration, washed with water, and then dried. This procedure gives 2-phenyl-5,8-dihydroxypyrimido[4,5-d]-pyridazinium hydrazide as yellow needles. Melting point 260° to 264° C (decomposition).

11 Parts of 2-phenyl-5,8-dihydroxypyrimido[4,5-d]-pyridazinium hydrazide is suspended in 250 volume parts of water and to the suspension is added 40 volume parts of 10 weight percent hydrochloric acid. The whole mixture is stirred at room temperature for 3 hours. The separated crystals are collected by filtration, washed with water and then dried.

This procedure gives 2-phenyl-5,8-dihydroxypyrimido-[4,5-d] pyridazine as colorless needles. Melting point: higher than 280° C.
Analysis:
  Calculated for $C_{12}H_8N_4O_2$: C, 60.00; H, 3.36; N, 23.33
  Found: C, 61.03; H, 3.52; N, 22.20

2. A mixture of 9.2 parts of 2-(2-thienyl)-4,5-diethoxycarbonylpyrimidine, 9.3 parts of hydrazine hydrate and 190 volume parts of methyl alcohol is heated under reflux for 4 hours. The separated crystals are collected by filtration, washed with methyl alcohol and dried. Then, the crystals are suspended in 200 volume parts of water and to the suspension is added 20 volume parts of 10 weight percent hydrochloric acid.

The whole mixture is stirred at room temperature for 3 hours. The separated crystals are collected by filtration, washed with water, and then dried.

This procedure gives 2-(2-thienyl)-5,8-dihydroxypyrimido[4,5-d]pyridazine as white crystals.
Melting point: higher than 300° C.
Analysis:
  Calculated for $C_{10}H_6N_4O_2S \cdot H_2O$: C, 45.46; H, 3.05; N, 21.21
  Found C: 45.43; H, 2.99; N, 21.26

After a similar manner to the above, the following compounds are produced.

| General formula | Substituent. $R_1$ | Melting point (M.P.) or boiling point (B.P.) (° C.) |
|---|---|---|
| $R_1$-pyrimido[4,5-d]pyridazine with OH at 5,8 | -CH₃-C₆H₄ (p-methylphenyl) | M.P. higher than 280. |
| | -C₆H₄-Cl | M.P. higher than 300. |
| | -C₆H₄-NO₂ | Do. |
| | furyl | Do. |
| | pyridyl | M.P. higher than 270. |
| | naphthyl | M.P. higher than 300. |

Part III [Step (D)]

1. A mixture of 0.35 part of 2-phenyl-5,8-dihydroxypyrimido[4,5-d]pyridazine, 35 parts of phosphorus oxychloride and 1.75 parts of phosphorus pentachloride is heated under reflux for 3 hours.

After the completion of the reaction, the reaction mixture is subjected to distillation under reduced pressure to remove the excess of phosphorus oxychloride.

To the residue is added cold water, and the separated crystals are collected by filtration.

The crystals are washed with 5 weight percent aqueous solution of sodium carbonate, and then with cold water, and dried.

This procedure gives 2-phenyl-5,8-dichloropyrimido-[4,5-d]pyridazine as pale yellow-brown-powder.
Melting point: 210° to 213° C (decomposition).
Analysis:
  Calculated for $C_{12}H_6Cl_2N_4$: C, 52.01; H, 2.18; N, 20.22; Cl, 25.59
  Found: C, 51.82; H, 2.04; N, 19.98; Cl, 25.36

2. A mixture of 5.0 parts of 2-(4-chlorophenyl)-5,8-dihydroxypyrimido[4,5-d]pyridazine, 50 parts of phosphorus oxychloride and 25 parts of phosphorus pentachloride is heated under reflux for 8 hours. After the completion of the reaction, the reaction mixture is subjected to distillation under reduced pressure to remove the excess of phosphorus oxychloride. To the residue is added ice water and the separated crystals are collected by filtration.

This procedure gives 2-(4-chlorophenyl)-5,8-dichloropyrimido[4,5-d]pyridazine melting at 240° to 242° C.
Analysis:
  Calculated for $C_{12}H_5Cl_3N_4$: C, 46.26; H, 1.62; N, 17.98
  Found: C, 40.48; H, 2.02; N, 14.59

3. A mixture of 2.4 parts of 2-(2-thienyl)-5,8-dihydroxypyrimido[4,5-d]pyrimidine, 50 parts of phosphorus oxychloride and 10 parts of phosphorus pentachloride is heated under reflux for 8 hours. After the completion of the reaction, the reaction mixture is subjected to distillation under reduced pressure to remove the excess of phosphorus oxychloride. To the residue is added ice water and the separated crystals are collected by filtration. This procedure gives 2-(2-thienyl)-5,8-dichloropyrimido-[4,5-d]pyridazine melting at 180° C.
Analysis:
  Calculated for $C_{10}H_4Cl_2N_4S$: C, 42.42; H, 1.42; N, 19.78
  Found: C, 42.79; H, 1.39; N, 20.12

4. A mixture of 1.0 part of 2-(2-furyl)-5,8-dihydroxypyrimido[4,5-d]pyridazine, 25 parts of phosphorus oxychloride and 5 parts of phosphorus pentachloride is heated under reflux for 11 hours. After completion of the reaction, the reaction mixture is subjected to distillation under reduced pressure to remove excess of phosphorus oxychloride. To the residue is added ice water under cooling with ice. The separated crystals are collected by filtration, washed with water and, then dried.

This procedure gives 2-(5-chlorofuryl-2)-5,8-dichloropyrimido[4,5-d]pyridazine as pale brown granules melting at 159° C.
Analysis:
  Calculated for $C_{10}H_3Cl_3N_4O$: C, 39.83; H, 1.00; N, 18.58
  Found: C, 39.56; H, 1.21; N, 18.26

After a similar manner to the above, the following compounds are produced.

| General formula | Substituent R₁ | X | Melting point (M.P.) or boiling point (B.P.) (° C.) |
|---|---|---|---|
| ![structure with X, R₁, N, N, N, N, X] | -C₆H₄-CH₃ (para-tolyl) | Cl | M.P., 175–177. |
| | -C₆H₄-NO₂ | Cl | M.P., 245–246. |
| | pyridyl | Cl | M.P., 180–185. |
| | naphthyl | Cl | M.P. higher than 300. |

Part IV [Step(E)]

1. A mixture of 2.0 parts of 2-phenyl-5,8-dichloropyrimido[4,5-d]pyridazine and 20 parts of morpholine is heated in a water bath at 80° to 85° C for 3 hours. After completion of the reaction, the reaction mixture is subjected to distillation under reduced pressure to remove the excess of morpholine. To the residue is added 30 volume parts of cold water. The separated crystals are collected by filtration and then recrystallized from methyl alcohol. This procedure gives 2-phenyl-5,8-dimorpholinopyrimido[4,5-d]pyridazine as yellow needles. Melting point: higher than 250° C Analysis:
Calculated for $C_{20}H_{22}N_6O_2$: C, 63.47; H, 5.86; N, 22.21
Found: C, 63.36; H, 5.77; N, 21.89

10.0 Parts of 2-phenyl-5,8-dimorpholinopyrimido[4,5-d]pyridazine is dissolved in 600 volume parts of hot ethyl alcohol and to the solution is added 200 volume parts of 10 weight percent alcoholic hydrochloric acid. The reaction mixture is kept cold to yield 2-phenyl-5,8-dimorpholino-pyrimido[4,5-d]pyridazine dihydrochloride as yellow needles melting at 192° to 194° C.

Analysis:
Calculated for $C_{20}H_{24}N_6O_2Cl_2$: C, 53.22; H, 5.32; N, 18.63
Found: C, 53.54; H, 5.19; N, 18.61

2. 2.8 Parts of 2-phenyl-5,8-dichloropyrimido[4,5-d]pyridazine is dissolved in 20 volume parts of isopropylamine and the solution is heated at 170° C for 3.5 hours. After cooling, the reaction mixture is subjected to distillation under reduced pressure to remove the excess of isopropylamine. To the residue is added 20 volume parts of cold water under stirring and the separated crystals are collected by filtration. The crystals are recrystallized from methyl alcohol to yield 2-phenyl-5,8-bis(isopropylamino)-pyrimido[4,5-d]pyridazine as red-orange prisms melting at 265°C.

Analysis:
Calculated for $C_{18}H_{22}N_{16}$: C, 67.05; H, 6.88; N, 26.07
Found: C, 67.75; H, 6.65; N, 25.93

3. 3.0 Parts of 2-phenyl-5,8-dichloropyrimido[4,5-d]pyridazine is dissolved in 14 volume parts of benzylamine and the solution is heated in an oil bath at 160° C for 3 hours. After cooling, the reaction mixture is dissolved in about 100 volume parts of chloroform.

The chloroform solution is, at first, washed with 5 weight percent hydrochloric acid until the washings no longer show alkaline, then with 1 weight percent aqueous solution of sodium carbonate and finally with water. The chloroform layer is dried over anhydrous sodium sulfate, and then subjected to distillation under reduced pressure to remove chloroform.

The black oily residue is dissolved in hot methyl alcohol and the solution is decolorized with active carbon. Thus treated solution is kept at room temperature, and the separated crystals are separated and recrystallized from methyl alcohol.

This procedure gives 2-phenyl-5,8-bis(benzylamino)-pyrimido[4,5-d]pyridazine as yellow needles melting at 85° to 87° C.

Analysis:
Calculated for $C_{26}H_{22}N_4$: C, 74.62; H, 5.30; N, 20.08
Found: C, 74.33; H, 5.41; N, 20.30

4. A mixture of 20 parts of 2-(4-chlorophenyl)-5,8-dichloropyrimido[4,5-d]pyridazine and 20 volume parts of morpholine is heated under reflux in an oil bath for 2 hours. After completion of the reaction, the reaction mixture is subjected to distillation to remove the excess of morpholine. To the residue is added 30 volume parts of cold water and the separated crystals are collected by filtration. The crystals are purified by a column-chromatography using a mixture of acetone and benzene (1:1) as a solvent. The purified crystals are recrystallized from ethyl alcohol to yield 2-(4-chlorophenyl)-5,8-dimorpholinopyrimido[4,5-d]pyridazine as yellow needles melting at 216° to 217° C.

Analysis:
Calculated for $C_{20}H_{21}N_6O_2Cl$: C, 58.18; H, 5.13; N, 20.36
Found: C, 57.88; H, 5.34; N, 20.22

5. A mixture of 1.4 parts of 2-(2-thienyl)-5,8-dichloropyrimido[4,5-d]pyridazine and 14 parts of morpholine is heated under reflux for 4 hours. After completion of the reaction, the reaction mixture is subjected to distillation under reduced pressure to remove the excess of morpholine. To the residue is added 50 volume parts of cold water and the separated crystals are collected by filtration. Then the crystals are dissolved once again in chloroform, and subjected to filtration. The filtrate is subjected to distillation to remove chloroform. The residue is recrystallized from ethyl alcohol to yield 2-(2-thienyl)-5,8-dimorpholinopyrimido[4,5-d]pyridazine as yellow granules melting at 200° to 203° C.

Analysis:
Calculated for $C_{18}H_{20}N_6O_2S \cdot H_2O$ : C, 53.72; H, 5.51; N, 20.89
Found: C, 53.66; H, 5.55; N, 20.95

6. A mixture of 0.4 part of 2-(5-chlorofuryl-2)-5,8-dichloropyrimido[4,5-d]pyridazine and 4 parts of morpholine is heated under reflux for 4 hours. After completion of the reaction, the reaction mixture is subjected to distillation to remove the excess of morpholine. To the residue is added 20 volume parts of cold water and the separated crystals are collected by filtration. Then, the crystals are subjected to a silica gel column-chromatography using chloroform as a solvent and subjected to distillation to remove the solvent. The residue is recrystallized from ethyl alcohol to give 2-(5-morpholinofuryl-2)-5,8-dimorpholinopyrimido[4,5-d]pyridazine as yellow-red needles melting at 222° C.

Analysis:
Calculated for $C_{22}H_{27}N_7O_4$: C, 58.28; H, 6.00; N, 21.62
Found: C, 58.03; H, 5.96; N, 21.57

7. A mixture of 0.5 part of 2-(β-naphthyl)-5,8-dichloropyrimido[4,5-d]pyridazine and 5 parts of morpholine is heated under reflux for 4 hours. After completion of the reaction, the reaction mixture is subjected to distillation to remove the excess of morpholine. To the residue is added cold water, and separated crystals are collected by filtration. The crystals are recrystallized from ethyl alcohol to yield 2-(β-naphthyl)-5,8-dimorpholinopyrimido[4,5-d]pyridazine as orange-yellow granules melting at 216° to 218° C.

Analysis:
Calculated for $C_{24}H_{24}N_6O_2$: C, 67.28; H, 5.65; N, 19.63
Found: C, 67.22; H, 5.69; N, 19.51

After a similar way to the above, the following compounds are produced.

| General formula | $R_1$ | $R_2$ | $R_3$ | Melting point (M.P.) (°C.) |
|---|---|---|---|---|
| ![pyrimido[4,5-d]pyridazine core with $R_1$, $R_2$, $R_3$] | phenyl | -N(pyrrolidinyl) | -N(pyrrolidinyl) | 141–142 (decomp.) |
| | phenyl | -N(piperidinyl) | -N(piperidinyl) | 144 (decomp.) |
| | phenyl | -N(piperazinyl)-N–CH$_2$-phenyl | -N(piperazinyl)-N–CH$_2$-phenyl | 181–182 (decomp.) |
| | phenyl | –NHCH$_2$CH$_2$OCH$_3$ | –NHCH$_2$CH$_2$OCH$_3$ | 116–117 |
| | phenyl | –NHCH$_2$CH$_2$OC$_2$H$_5$ | –NHCH$_2$CH$_2$OC$_2$H$_5$ | 125–127 |
| | o-tolyl (CH$_3$) | -N(morpholinyl) | -N(morpholinyl) | 160–162 |
| | o-tolyl (CH$_3$) | -N(piperidinyl) | -N(piperidinyl) | 226–228 |
| | o-tolyl (CH$_3$) | –NHCH(CH$_3$)$_2$ | –NHCH(CH$_3$)$_2$ | 273–274 |
| | 4-Cl-phenyl | -N(piperidinyl) | -N(piperidinyl) | 180–181 |
| | 4-NO$_2$-phenyl | -N(morpholinyl) | -N(morpholinyl) | 269–270 |

| General formula | $R_1$ | $R_2$ | $R_3$ | Melting point (M.P.) (°C.) |
|---|---|---|---|---|
| ![pyrimido[4,5-d]pyridazine core with $R_1$, $R_2$, $R_3$] | 4-NO$_2$-phenyl | -N(piperidinyl) | -N(piperidinyl) | 221–222 |
| | 2-thienyl | -N(piperidinyl) | -N(piperidinyl) | 158–159 |
| | 2-furyl | -N(piperidinyl) | -N(piperidinyl) | 185 |
| | 2-pyridyl | -N(morpholinyl) | -N(morpholinyl) | 197 |
| | 2-pyridyl | -N(piperidinyl) | -N(piperidinyl) | 133 |

| General formula | Substituent | | | Melting point (M.P.) (° C.) |
|---|---|---|---|---|
| | $R_1$ | $R_2$ | $R_3$ | |
| | phenyl | −N(CH₃)(CH₂CH₂OH) | −N(CH₃)(CH₂CH₂OH) | 119–121 |
| | phenyl | morpholino | morpholino | *187–189 |

*Plus dioxalate.

What is claimed is:

1. A compound of the formula:

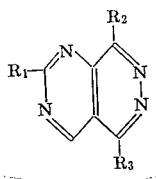

wherein:
$R_1$ is naphthyl, phenyl or phenyl monosubstituted by nitro, halo or $C_1$ to $C_3$ alkyl and
$R_2$ and $R_3$ are the same or different and are $C_1$ to $C_6$ alkylamino or $C_1$ to $C_6$ dialkylamino which is unsubstituted or substituted by $C_1$ or $C_2$ alkoxy or hydroxy, piperidino, morpholino, pyrrolidino, N-benzylpiperazino, benzylamino or anilino.

2. A compound according to claim 18 wherein
$R_1$ is naphthyl, phenyl or phenyl monosubstituted by nitro, chloro or methyl, and
$R_2$ and $R_3$ are the same or different and are isopropylamino, N-(2-methoxyethyl)amino, N-(2-ethoxyethylamino),N-methyl-N-(2-hydroxyethyl)amino, anilino, benzylamino, piperidino, morpholino, pyrrolidino and N-benzylpiperazino.

3. A compound as claimed in claim 2, said compound being 2-phenyl-5,8-dimorpholinopyrimido[4,5-d]pyridazine.

4. A compound as claimed in claim 2, said compound being 2-phenyl-5,8-dipyrrolidinopyrimido[4,5-d]pyridazine.

5. A compound as claimed in claim 2, said compound being 2-phenyl-5,8-dipiperidinopyrimido[4,5-d]pyridazine.

6. A compound as claimed in claim 2, said compound being 2-phenyl-5,8-bis(N-benzylpiperazino)-pyrimido[4,5-d]pyridazine.

7. A compound as claimed in claim 2, said compound being 2-phenyl-5,8-bis(benzylamino)pyrimido[4,5-d]pyridazine.

8. A compound as claimed in claim 2, said compound being 2-phenyl-5,8-bis(isopropylamino)pyrimido[4,5-d]pyridazine.

9. A compound as claimed in claim 2, said compound being 2-phenyl-5,8-bis(2-methoxyethylamino)-pyrimido[4,5-d]-pyridazine.

10. A compound as claimed in claim 2, said compound being 2-phenyl-5,8-bis(2-ethoxyethylamino)-pyrimido[4,5-d]-pyridazine.

11. A compound as claimed in claim 2, said compound being 2-phenyl-5,8-bis(N-methyl-2-hydroxyethylamino)pyrimido-[4,5-d]pyridazine.

12. A compound as claimed in claim 2, said compound being 2-(3-tolyl)-5,8-dimorpholinopyrimido[4,5-d]pyridazine.

13. A compound as claimed in claim 2, said compound being 2-(3-tolyl)-5,8-dipiperidinopyrimido[4,5-d]pyridazine.

14. A compound as claimed in claim 2, said compound being 2-(3-tolyl)-5,8-bis(isopropylamino)-pyrimido[4,5-d]pyridazine.

15. A compound as claimed in claim 2, said compound being 2-(4-chlorophenyl)-5,8-dimorpholinopyrimido[4,5-d]-pyrimidine.

16. A compound as claimed in claim 2, said compound being 2-(4-chlorophenyl)-5,8-dipiperidinopyrimido[4,5-d]-pyridazine.

17. A compound as claimed in claim 2, said compound being 2-(4-nitrophenyl)-5,8-dimorpholinopyrimido[4,5-d]-pyridazine.

18. A compound as claimed in claim 2, said compound being 2-(4-nitrophenyl)-5,8-dipiperidinopyrimido[4,5-d]-pyridazine.

19. A compound as claimed in claim 2, said compound being 2-(β-naphthyl)-5,8-dimorpholinopyrimido[4,5-d]pyridazine.

* * * * *